United States Patent
Bushman

(10) Patent No.: US 8,966,200 B1
(45) Date of Patent: Feb. 24, 2015

(54) PRUNING FREE BLOCKS OUT OF A DECREMENTAL BACKUP CHAIN

(71) Applicant: Storagecraft Technology Corporation, Draper, UT (US)

(72) Inventor: Nathan S. Bushman, Pleasant Grove, UT (US)

(73) Assignee: Storagecraft Technology Corporation, Draper, UT (US)

( * ) Notice: Subject to any disclaimer, the term of this patent is extended or adjusted under 35 U.S.C. 154(b) by 0 days.

(21) Appl. No.: 14/501,846

(22) Filed: Sep. 30, 2014

(51) Int. Cl.
*G06F 12/00* (2006.01)
*G06F 13/00* (2006.01)
*G06F 11/14* (2006.01)

(52) U.S. Cl.
CPC ........ *G06F 11/1451* (2013.01); *G06F 11/1461* (2013.01); *G06F 2201/84* (2013.01)
USPC ............ 711/162; 711/207; 711/221; 711/165

(58) Field of Classification Search
None
See application file for complete search history.

(56) References Cited

U.S. PATENT DOCUMENTS

| 8,751,454 B1* | 6/2014 | Bushman et al. | 707/640 |
|---|---|---|---|
| 2006/0075294 A1* | 4/2006 | Ma et al. | 714/13 |
| 2006/0149916 A1* | 7/2006 | Nase | 711/173 |
| 2007/0261059 A1* | 11/2007 | Orth et al. | 719/312 |
| 2008/0140963 A1* | 6/2008 | Thomason et al. | 711/162 |
| 2012/0109897 A1* | 5/2012 | Janakiraman et al. | 707/660 |
| 2013/0246724 A1* | 9/2013 | Furuya | 711/162 |
| 2014/0164330 A1* | 6/2014 | Barnes et al. | 707/646 |
| 2014/0201162 A1* | 7/2014 | Kumarasamy et al. | 707/679 |

* cited by examiner

*Primary Examiner* — Sean D Rossiter
(74) *Attorney, Agent, or Firm* — Maschoff Brennan

(57) ABSTRACT

Pruning free blocks out of a decremental backup chain. In one example embodiment, a method for pruning free blocks out of a decremental backup in a decremental backup chain includes identifying a decremental backup chain that includes one or more decremental backups of a source storage and a base backup of the source storage, identifying, for pruning, a target decremental backup in the decremental backup chain, retrieving one or more file system block allocation maps (FSBAMs) for points in time represented by the target decremental backup and represented by any of the other decremental backups in the decremental backup chain that depend on the target decremental backup, creating a master block allocation map (MBAM) by combining the one or more FSBAMs, and pruning free blocks, corresponding to block positions that are indicated as being free in the MBAM, out of the target decremental backup.

20 Claims, 6 Drawing Sheets

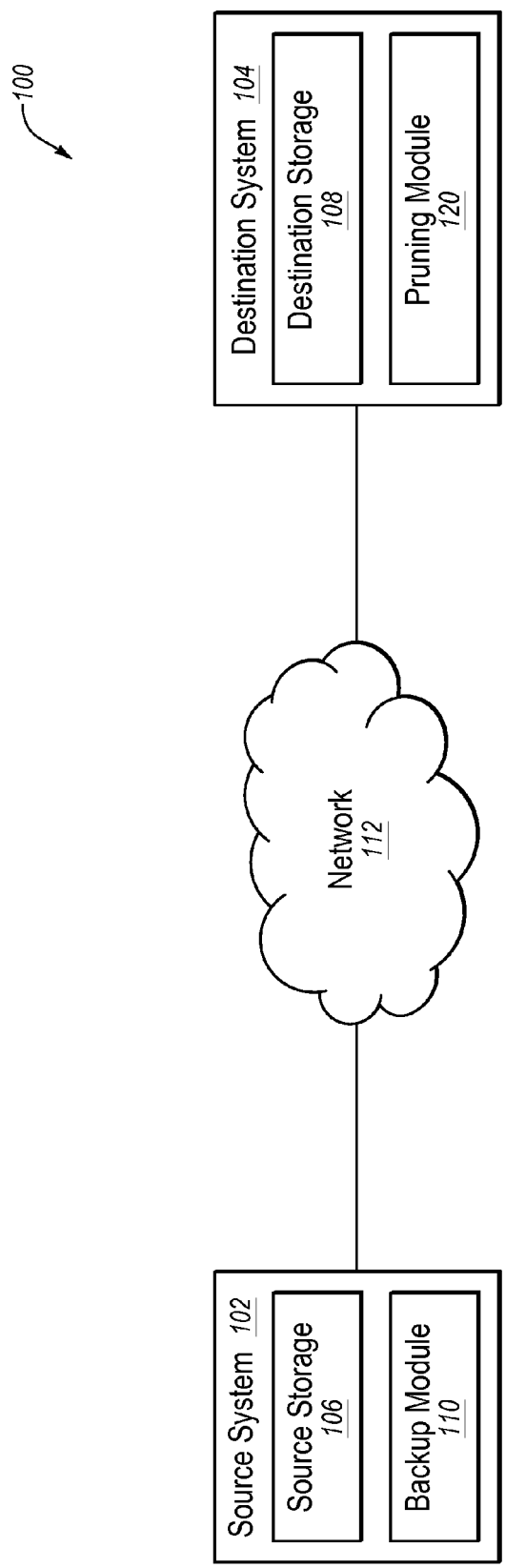

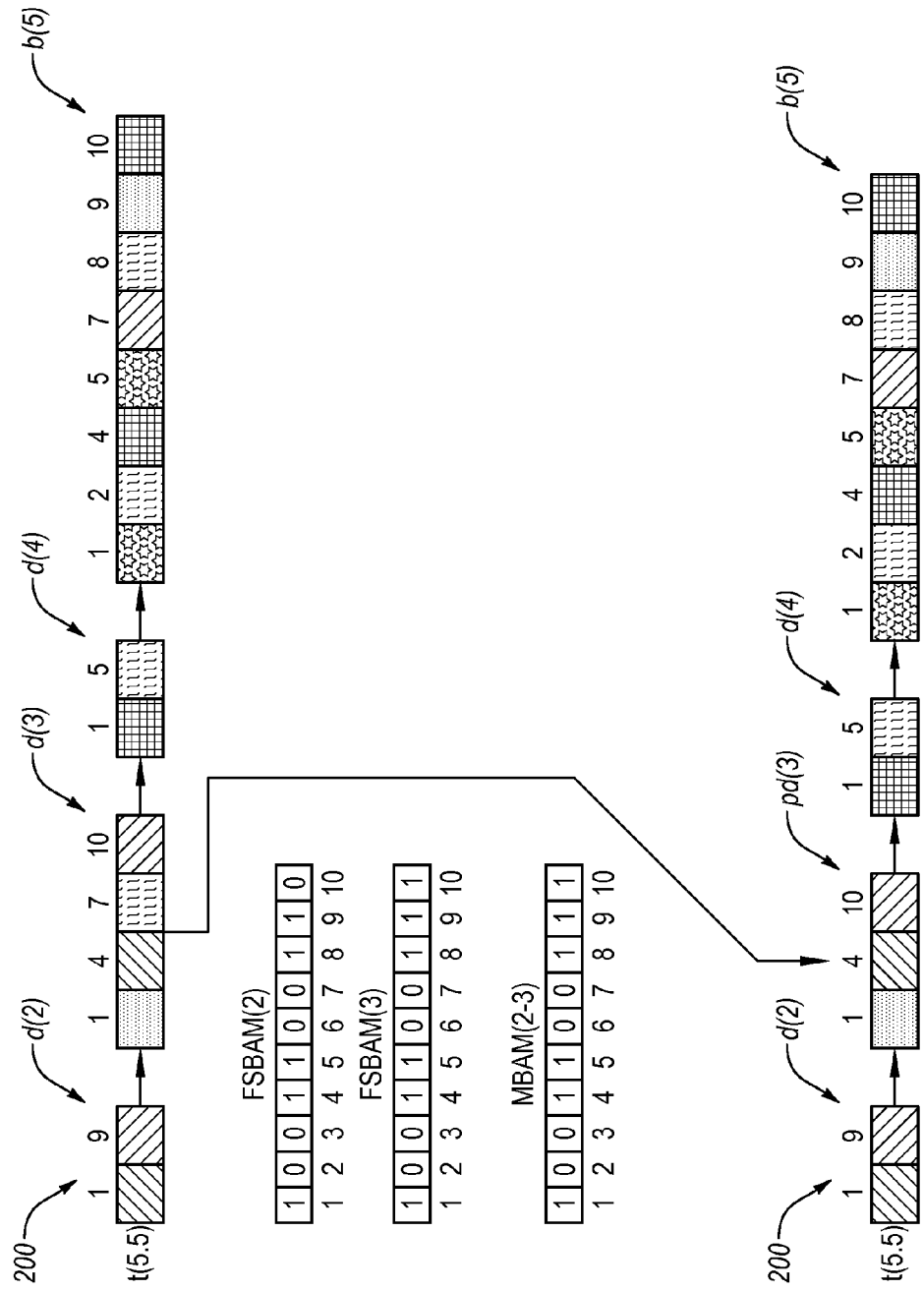

PRUNING FREE BLOCKS OUT OF A DECREMENTAL BACKUP CHAIN

FIELD

The embodiments disclosed herein relate to pruning free blocks out of a decremental backup chain.

BACKGROUND

A storage is computer-readable media capable of storing data in blocks. Storages face a myriad of threats to the data they store and to their smooth and continuous operation. In order to mitigate these threats, a backup of the data in a storage may be created at a particular point in time to enable the restoration of the data at some future time. Such a restoration may become desirable, for example, if the storage experiences corruption of its stored data, if the storage becomes unavailable, or if a user wishes to create a second identical storage.

A storage is typically logically divided into a finite number of fixed-length blocks. A storage also typically includes a file system which tracks the locations of the blocks that are allocated to each file that is stored in the storage. The file system also tracks the blocks that are not allocated to any file. The file system generally tracks allocated and free blocks using specialized data structures, referred to as file system metadata. File system metadata is also stored in designated blocks in the storage.

Various techniques exist for backing up a source storage. One common technique involves backing up individual files stored in the source storage on a per-file basis. This technique is often referred to as file backup. File backup uses the file system of the source storage as a starting point and performs a backup by writing the files to a destination storage. Using this approach, individual files are backed up if they have been modified since the previous backup. File backup may be useful for finding and restoring a few lost or corrupted files. However, file backup may also include significant overhead in the form of bandwidth and logical overhead because file backup requires the tracking and storing of information about where each file exists within the file system of the source storage and the destination storage.

Another common technique for backing up a source storage ignores the locations of individual files stored in the source storage and instead simply backs up all allocated blocks stored in the source storage. This technique is often referred to as image backup because the backup generally contains or represents an image, or copy, of the entire allocated contents of the source storage. Using this approach, individual allocated blocks are backed up if they have been modified since the previous backup. Because image backup backs up all allocated blocks of the source storage, image backup backs up both the blocks that make up the files stored in the source storage as well as the blocks that make up the file system metadata. Also, because image backup backs up all allocated blocks rather than individual files, this approach does not necessarily need to be aware of the file system metadata or the files stored in the source storage, beyond utilizing minimal knowledge of the file system metadata in order to only back up allocated blocks since free blocks are not generally backed up.

Image backup can be relatively fast compared to file backup because reliance on the file system is minimized. An image backup can also be relatively fast compared to a file backup because seeking during image backup may be reduced. In particular, during image backup, blocks are generally read sequentially with relatively limited seeking. In contrast, during file backup, blocks that make up individual files may be scattered in the source storage, resulting in relatively extensive seeking.

Although image backup may be fast compared to file backup, creation of a base backup of source storage can take hours and possibly days to complete, depending on the size of the source storage. Further, repeatedly backing up an entire source storage may be unnecessary where most of the allocated blocks in the source storage do not frequently change.

One alternative to creating multiple base backups is to employ a decremental backup system, also known as reverse incremental backup system. Decremental backup systems initially create a base backup to capture the state of a source storage at an initial point in time, then update the base backup to capture the state of the source storage at a subsequent point in time by modifying only those blocks in the base backup that were modified between the initial and subsequent points in time. Prior to the updating of the base backup, however, any original blocks in the base backup that correspond to the modified blocks are copied to a decremental backup, thus enabling restoration of the source storage at the initial point in time (by restoring the updated base backup and then restoring the decremental backup) or at the subsequent point in time (by simply restoring the updated base backup).

One common problem that is encountered when repeatedly backing up a source storage using a decremental backup system is the potential for the inclusion of free blocks in successive backups. For example, a very large digital movie file may initially be stored on a source storage. The allocated blocks that correspond to the movie file may then be stored in an initial backup of the source storage. After the creation of the initial backup, the movie file may then be deleted from the source storage, thus rendering the corresponding blocks as free blocks. As new backups are subsequently created, the free blocks corresponding to the deleted movie file may be needlessly retained in one or more of the backups. Retaining free blocks in backups may increase the overall size requirements of a destination storage where the backups are stored, increase the bandwidth overhead of transporting the backups, increase the processing time associated with consolidating the backups, and/or increase the processing time associated with restoring the backups.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments described herein relate to pruning free blocks out of a decremental backup chain. The example methods disclosed herein enable free blocks in a backup in a decremental backup chain to be identified and then pruned out of the backup. This pruning may decrease the overall size requirements of a destination storage where the backup is stored, decrease the bandwidth overhead of transporting the backup, decrease the processing time associated with consolidating the backup with other backups in the decremental backup chain, and/or decrease the processing time associated with restoring the backup.

In one example embodiment, a method for pruning free blocks out of a decremental backup in a decremental backup chain includes identifying a decremental backup chain that includes one or more decremental backups of a source storage and a base backup of the source storage, identifying, for pruning, a target decremental backup in the decremental backup chain, retrieving one or more file system block allocation maps (FSBAMs) for points in time represented by the target decremental backup and represented by any of the other decremental backups in the decremental backup chain that depend on the target decremental backup, creating a master block allocation map (MBAM) by combining the one or more FSBAMs, and pruning free blocks, corresponding to block positions that are indicated as being free in the MBAM, out of the target decremental backup.

In another example embodiment, a method for pruning free blocks out of a base backup of a decremental backup chain includes identifying a decremental backup chain that includes zero or more decremental backups of a source storage and a base backup of the source storage, retrieving one or more file system block allocation maps (FSBAMs) for points in time represented by the backup(s) in the decremental backup chain, creating a master block allocation map (MBAM) by combining the one or more FSBAM, and pruning free blocks, corresponding to block positions that are indicated as being free in the MBAM, out of the base backup.

It is to be understood that both the foregoing general description and the following detailed description are exemplary and explanatory and are not restrictive of the invention as claimed.

BRIEF DESCRIPTION OF THE DRAWINGS

Example embodiments will be described and explained with additional specificity and detail through the use of the accompanying drawings in which:

FIG. 1 is a schematic block diagram illustrating an example image backup system;

FIG. 3 is a schematic block diagram illustrating an example pruning of a decremental backup in a decremental backup chain;

DESCRIPTION OF EMBODIMENTS

Figure 2A:
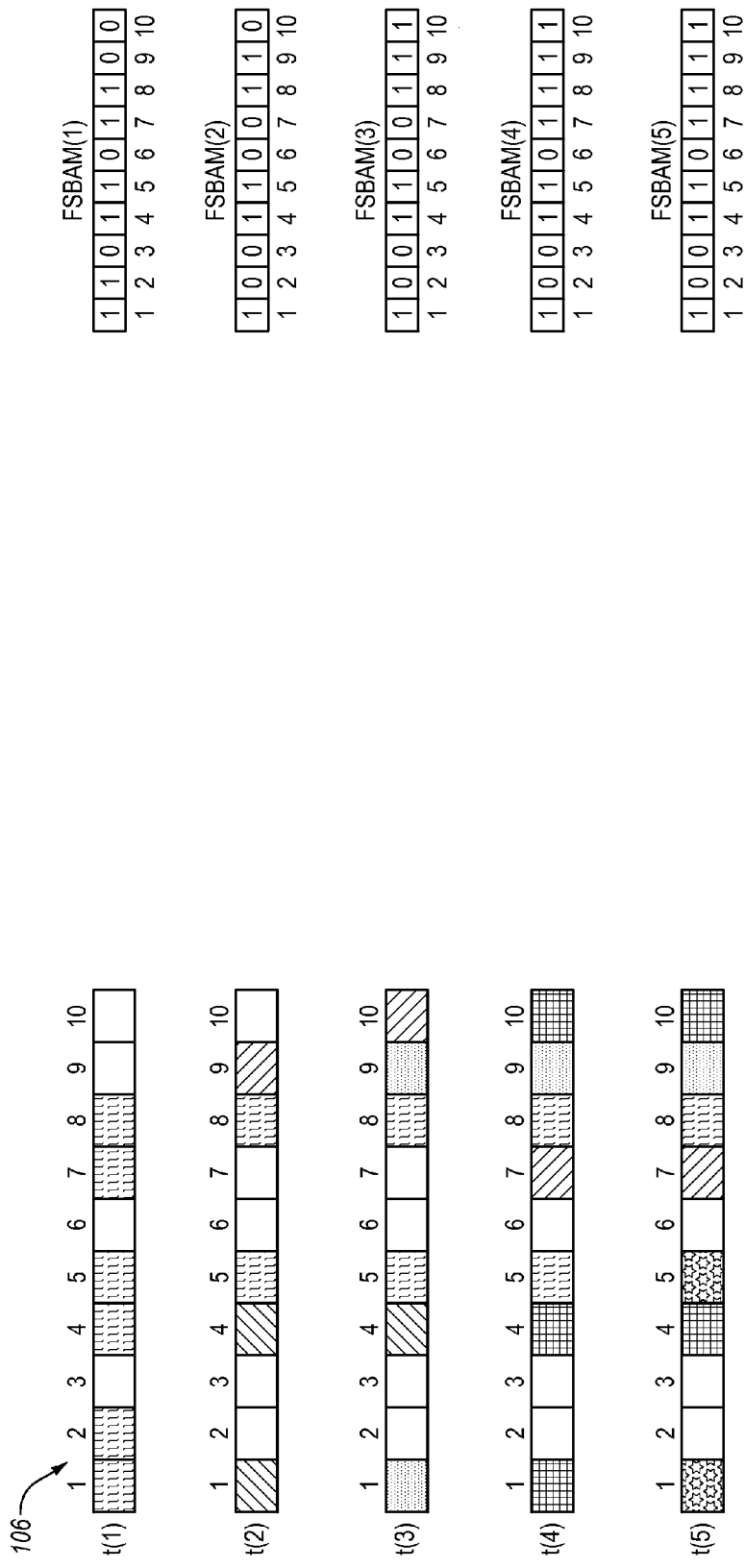
FIGS. 2A and 2B are schematic block diagrams illustrating an example source storage and an example decremental backup chain.

The term "storage" as used herein refers to computer-readable media, or some logical portion thereof such as a volume, capable of storing data in blocks. The term "block" as used herein refers to a fixed-length discrete sequence of bits. In some example embodiments, the size of each block may be configured to match the standard sector size of a file system of a storage on which the block is stored. For example, the size of each block may be 512 bytes (4096 bits) where 512 bytes is the size of a standard sector. The term "allocated block" as used herein refers to a block in a storage that is currently tracked as storing data by a file system of the storage. The term "free block" as used herein refers to a block in a storage that is not currently employed nor tracked as storing data by a file system of the storage. The term "backup" when used herein as a noun refers to a copy or copies of one or more blocks from a storage. The term "base backup" as used herein refers to a base backup of a storage that includes at least a copy of each unique allocated block of the storage at a point in time such that the base backup can be restored on its own to recreate the state of the storage at the point in time, without being dependent on any other backup. A "base backup" may also include nonunique allocated blocks and free blocks of the storage at the point in time. The term "decremental backup" as used herein refers to an at least partial backup of a storage that includes at least a copy of each unique allocated block from a base backup of the storage that corresponds to a block that was modified in the source storage between a previous point in time and a subsequent point in time, such that the decremental backup, along with all subsequent decremental backups of the storage, including a base backup of the storage, can be restored together to recreate the exact state of the storage at the previous point in time. A "decremental backup" may also include nonunique allocated blocks and free blocks from a base backup of the storage that correspond to blocks that were modified in the source storage between the point in time and the subsequent point in time. The term "modified block" as used herein refers to a block that was modified either because the block was previously allocated and changed or because the block was modified by being newly allocated. A "base backup" and/or a "decremental backup" may exclude certain undesired allocated blocks such as blocks of data belonging to files whose contents are not necessary for restoration purposes, such as virtual memory pagination files and machine hibernation state files.

FIG. 1 is a schematic block diagram illustrating an example image backup system 100. As disclosed in FIG. 1, the example image backup system 100 includes a source system 102 and a destination system 104. The source system 102 includes a source storage 106 and the destination system 104 includes a destination storage 108. The source system 102 also includes a backup module 110. The destination system 104 further includes a pruning module 120. The systems 102 and 104 are able to communicate with one another over a network 112.

The source system 102 and the destination system 104 may be any computing device capable of supporting a storage, including a virtual storage such as a virtual volume, and communicating with other systems including, for example, a file server, a web server, a personal computer, a desktop computer, a laptop computer, a handheld device, a multiprocessor system, a microprocessor-based or programmable consumer electronic device, a smartphone, a digital camera, a hard disk drive, a flash memory drive, a virtual machine, or some combination thereof. The network 112 may be any wired or wireless communication network including, for example, a Local Area Network (LAN), a Metropolitan Area Network (MAN), a Wide Area Network (WAN), a Wireless Application Protocol (WAP) network, a Bluetooth network, an Internet Protocol (IP) network such as the internet, or some combination thereof.

In one example embodiment, the source system 102 may be a desktop computer, the destination system 104 may be a file server, and the network 112 may include the internet. In this example embodiment, the desktop computer may be configured to periodically back up its storage over the internet as part of a backup job by creating a base backup and multiple decremental backups in a decremental backup chain and storing these backups in the storage of the file server. The desktop computer may also be configured to track modifications to its storage between backups in order to easily and quickly identify, during the creation of a decremental backup, only those blocks that were modified. The file server may be further configured to periodically prune free blocks out of one or more of the backups in the decremental backup chain, thereby decreasing the size of the backups, as discussed below. The file server may also be configured to restore one or more of the backups to the storage of the desktop computer over the internet if the desktop computer experiences corruption or a user simply desires to restore the storage of the desktop computer to an earlier point in time.

The image backups stored in the destination storage 108 may be created by the backup module 110. For example, the backup module 110 may be configured to execute computer instructions to perform image backup operations of creating a base backup and multiple decremental backups of the source storage 106. It is noted that these image backups may initially be created on the source system 102 and then copied to the destination system 104.

The pruning module 120 may be configured to prune free blocks out of the backups stored in the destination storage 108. For example, after the backup module 110 has created a base backup and multiple decremental backups of the source storage 106, stored the base backup and multiple decremental backups in the destination storage 108, and one or more oldest decremental backups have been deleted to save space, the pruning module 120 may prune free blocks out of one or more of the remaining backups, thereby decreasing the size of the backups.

Although only a single storage is disclosed in each of the systems 102 and 104 in FIG. 1, it is understood that any of the systems 102 and 104 may instead include two or more storages. Further, although the systems 102 and 104 are disclosed in FIG. 1 as communicating over the network 112, it is understood that the systems 102 and 104 may instead communicate directly with each other. For example, in some embodiments the systems 102 and 104 may be combined into a single system. Also, although the storages 106 and 108 are disclosed as separate storages, it is understood that the storages 106 and 108 may be combined into a single storage. For example, in some embodiments a first volume of the source storage 106 may function as a source storage during the creation of a backup that is stored in a second volume of the source storage 106. Subsequently, the backup stored in the second volume may be restored to the first volume, which may enable the first volume of the source storage 106 to be restored to a state of an earlier point in time. In another example, the source system 102 may have a separate storage (not shown) to which a backup of the source storage 106 is restored. In both of these examples, the source system 102 functions as both a source system and a restore system. Further, although the backup module 110 and the pruning module 120 are the only modules disclosed in the example image backup system 100 of FIG. 1, it is understood that the functionality of the backup module 110 and the pruning module 120 may be replaced or augmented by one or more similar modules residing on either of the systems 102 and 104 or another system.

Having described one specific environment with respect to FIG. 1, it is understood that the specific environment of FIG. 1 is only one of countless environments in which the example methods disclosed herein may be practiced. The scope of the example embodiments is not intended to be limited to any particular environment.

Figure 2B:
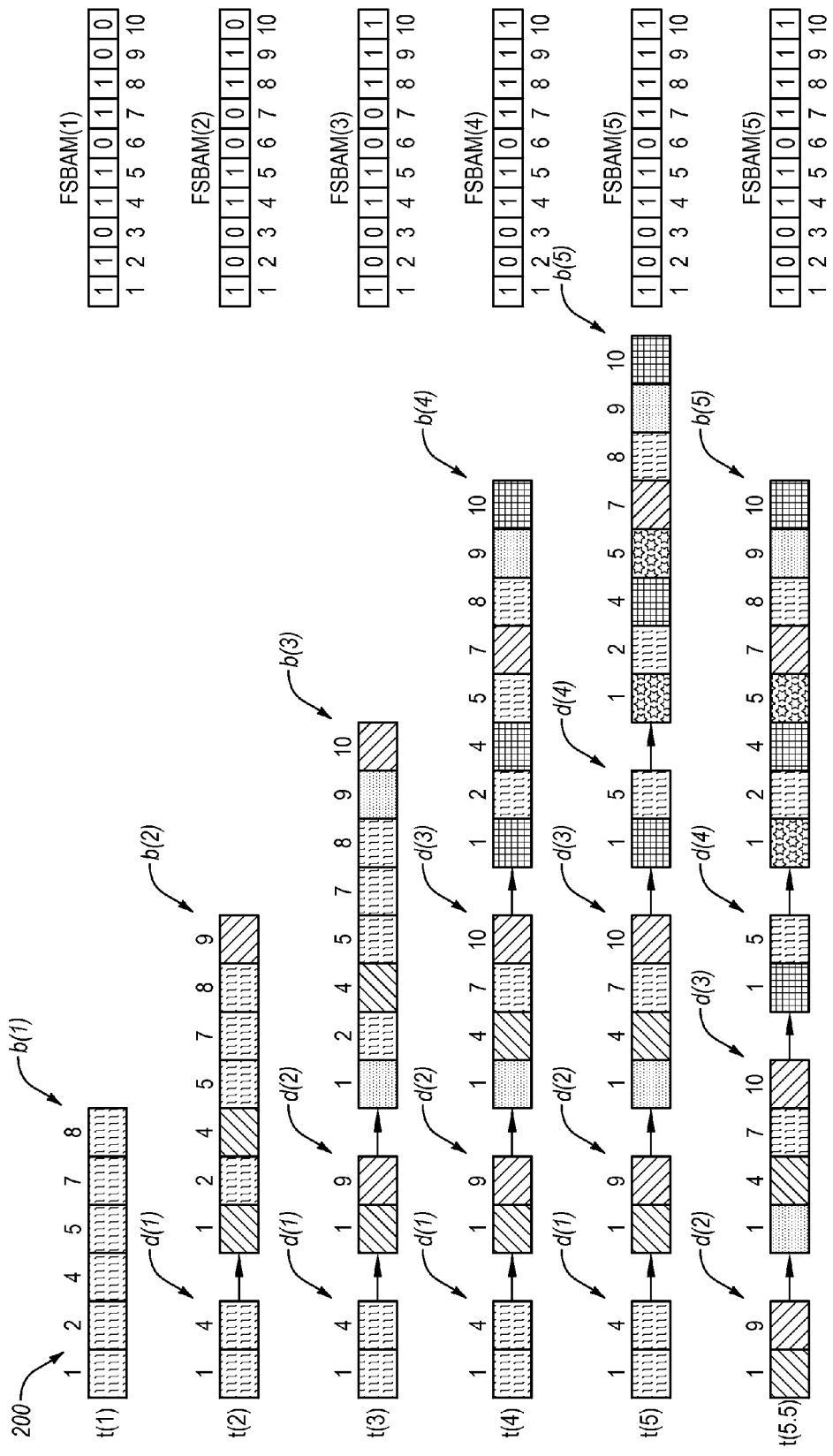

FIGS. 2A and 2B are schematic block diagrams illustrating the example source storage 106 and an example decremental backup chain 200. In particular, FIG. 2A discloses the states of the source storage 106 at times t(1), t(2), t(3), t(4), and t(5) and FIG. 2A discloses the example decremental backup chain 200 representing the states of the source storage 106 at times t(1), t(2), t(3), t(4), and t(5). As disclosed in FIGS. 2A, 2B, 3, and 4, blocks that are allocated are illustrated with a hatch pattern, and blocks that are free are illustrated as blank.

FIGS. 2A and 2B also illustrate file system block allocation map (FSBAMs) that represent the allocated and free blocks of the source storage 106 at times t(1), t(2), t(3), t(4), and t(5), namely, FSBAM(1), FSBAM(2), FSBAM(3), FSBAM(4), and FSBAM(5), respectively. As disclosed in FIGS. 2A and 2B, allocated blocks in the FSBAMs are represented with a 1 bit and free blocks in the FSBAMs are represented with a 0 bit. For example, the FSBAM(2) has allocated blocks in positions 1, 4, 5, 8, and 9 and the FSBAM(3) has allocated blocks in positions 1, 4, 5, 8, 9, and 10. Although the FSBAMs are disclosed in FIGS. 2A and 2B as including a 1 bit or 0 bit for each block position, it is understood that the FSBAMs may instead be implemented using other data structures that do not necessarily include a bit for each block position, such as a run-length encoded list of free and/or allocated blocks. The FSBAMs may be employed during a pruning of the decremental backup chain 200, as discussed in greater detail below.

As disclosed in FIGS. 2A and 2B, the example decremental backup chain 200 includes base backups b(1), b(2), b(3), b(4), and b(5), which represent the states of the source storage 106 at times t(1), t(2), t(3), t(4), and t(5), respectively. In addition, the decremental backup chain 200 includes decremental backups d(1), d(2), d(3), and d(4), which represent the states of the source storage 106 at times t(1), t(2), t(3), and t(4), respectively. In one example embodiment, the backup module 110 creates the base backups b(1), b(2), b(3), b(4), and b(5) and the decremental backups d(1), d(2), d(3), and d(4) of the source storage 106 and stores them in the destination storage 108.

The base backup b(1) may be created to preserve the state of the source storage 106 at time t(1). The creation of the base backup b(1) may include the backup module 110 copying all allocated blocks of the source storage 106 as allocated at time t(1) and storing the allocated blocks in the destination storage 108. In this example, only blocks in positions 1, 2, 4, 5, 7, and 8 are allocated in the source storage 106 at time t(1), as blocks at positions 3, 6, 9, and 10 are not allocated at time t(1). The state of the source storage 106 at time t(1) may be captured using snapshot technology in order to capture the data stored in the source storage 106 at time t(1) without interrupting other processes, thus avoiding downtime of the source storage 106. The base backup b(1) may be very large depending on the size of the source storage 106 and the number of allocated blocks at time t(1). As a result, the base backup b(1) may take a relatively long time to create and consume a relatively large amount of space in the destination storage 108. It is noted that the base backup b(1) may have a randomly-writeable format in order to allow the base backup b(1) to have new blocks inserted into the base backup at various positions. The base backup b(1) may be associated with the FSBAM(1), which represents the allocated and free blocks of the source storage 106 at time t(1).

Next, the decremental backup d(1) may be created to preserve the state of the source storage 106 at time t(1) while the base backup b(1) is updated to capture the state of the source storage 106 at time t(2), resulting in the updated base backup b(2). This may be accomplished by the backup module 110 identifying allocated blocks in the source storage 106 that changed between time t(1) and time t(2), as well as newly-allocated blocks that were allocated in the source storage 106 between time t(1) and time t(2). In this example, the blocks at positions 1 and 4 in the source storage 106 were changed, and the block at position 9 in the source storage 106 was newly allocated. The backup module 110 may then identify original blocks in the base backup b(1) with the same positions as the changed allocated and newly-allocated blocks in the source storage 106, namely, the blocks at positions 1 and 4 in the base backup b(1), and copy these original blocks at positions 1 and 4 from the base backup b(1) into the decremental backup d(1).

The changed allocated blocks and newly-allocated blocks from the source storage 106, namely, the changed allocated blocks from positions 1 and 4 and newly-allocated block from position 9 of the source storage 106, are then copied to the base backup b(1), resulting in the updated base backup b(2). As a result, the decremental backup d(1) represents the state of the source storage 106 at time t(1) and the updated base backup b(2) represents the state of the source storage 106 at time t(2).

The base backup b(2) may be associated with the FSBAM (2), which represents the allocated and free blocks of the source storage 106 at time t(2). By comparing the FSBAM(2) to the FSBAM(1), it can be determined that between time t(1) and time t(2) the previously-allocated blocks at positions 2 and 7 in the source storage 106 became free blocks and the previously-free block at position 9 in the source storage 106 became an allocated block. The blocks at positions 2 and 7 in the source storage 106 may have become free for a variety of reasons including due to a file in the source storage 106 that the blocks at positions 2 and 7 belong to being changed or deleted or moved. However, even though the blocks at positions 2 and 7 are free by time t(2), these free blocks remain in the updated base backup b(2). Therefore, these free blocks at positions 2 and 7 are needlessly retained in the updated base backup b(2), and thereby needlessly increase the size of the updated base backup b(2). The example methods of pruning free blocks out of an incremental backup chain disclosed herein may be employed to remove these free blocks out of the decremental backup chain 200, as discussed in greater detail below.

Next, the decremental backup d(2) may be created to preserve the state of the source storage 106 at time t(2) while the updated base backup b(2) is again updated to capture the state of the source storage 106 at time t(3), resulting in the updated base backup b(3). This may be accomplished by the backup module 110 identifying allocated blocks in the source storage 106 that changed between time t(2) and time t(3), as well as newly-allocated blocks that were allocated in the source storage 106 between time t(2) and time t(3). In this example, the blocks at positions 1 and 9 in the source storage 106 were changed, and the block at position 10 in the source storage 106 was newly allocated. The backup module 110 may then identify original blocks in the base backup b(2) with the same positions as the changed allocated and newly-allocated blocks in the source storage 106, namely, the blocks at positions 1 and 9, and copy these original blocks at positions 1 and 9 from the updated base backup b(2) into the decremental backup d(2). The changed allocated blocks and newly-allocated blocks from the source storage 106, namely, the changed allocated blocks from positions 1 and 9 and the newly-allocated block from position 10 of the source storage 106, are then copied to the updated base backup b(2), resulting in the updated base backup b(3). As a result, the decremental backup d(1) represents the state of the source storage 106 at time t(1), the decremental backup d(2) represents the state of the source storage 106 at time t(2), and the updated base backup b(3) represents the state of the source storage 106 at time t(3). The base backup b(3) may be associated with the FSBAM(3), which represents the allocated and free blocks of the source storage 106 at time t(3).

Next, the decremental backup d(3) may be created to preserve the state of the source storage 106 at time t(3) while the updated base backup b(3) is again updated to capture the state of the source storage 106 at time t(4), resulting in the updated base backup b(4). This may be accomplished by the backup module 110 identifying allocated blocks in the source storage 106 that changed between time t(3) and time t(4), as well as newly-allocated blocks that were allocated in the source storage 106 between time t(3) and time t(4). In this example, the blocks at positions 1, 4, and 10 in the source storage 106 were changed, and the block at position 7 in the source storage 106 was newly allocated. The backup module 110 may then identify original blocks in the base backup b(3) with the same positions as the changed allocated and newly-allocated blocks in the source storage 106, namely, the blocks at positions 1, 4, 7, and 10, and copy these original blocks at positions 1, 4, 7, and 10 from the updated base backup b(3) into the decremental backup d(d). The changed allocated blocks and newly-allocated blocks from the source storage 106, namely, the changed allocated blocks from positions 1, 4, and 10 and the newly-allocated block from position 7 of the source storage 106, are then copied to the updated base backup b(3), resulting in the updated base backup b(4). As a result, the decremental backup d(1) represents the state of the source storage 106 at time t(1), the decremental backup d(2) represents the state of the source storage 106 at time t(2), the decremental backup d(3) represents the state of the source storage 106 at time t(3), and the updated base backup b(4) represents the state of the source storage 106 at time t(4). The base backup b(4) may be associated with the FSBAM(4), which represents the allocated and free blocks of the source storage 106 at time t(4).

Next, the decremental backup d(4) may be created to preserve the state of the source storage 106 at time t(4) while the updated base backup b(4) is again updated to capture the state of the source storage 106 at time t(5), resulting in the updated base backup b(5). This may be accomplished by the backup module 110 identifying allocated blocks in the source storage 106 that changed between time t(4) and time t(5), as well as newly-allocated blocks that were allocated in the source storage 106 between time t(4) and time t(5). In this example, the blocks at positions 1 and 5 in the source storage 106 were changed, and no blocks in the source storage 106 were newly allocated. The backup module 110 may then identify original blocks in the base backup b(4) with the same positions as the changed allocated blocks in the source storage 106, namely, the blocks at positions 1 and 5, and copy these original blocks at positions 1 and 5 from the updated base backup b(4) into the decremental backup d(4). The changed allocated blocks from the source storage 106, namely, the changed allocated blocks from positions 1 and 5 of the source storage 106, are then copied to the updated base backup b(4), resulting in the updated base backup b(5). As a result, the decremental backup d(1) represents the state of the source storage 106 at time t(1), the decremental backup d(2) represents the state of the source storage 106 at time t(2), the decremental backup d(3) represents the state of the source storage 106 at time t(3), the decremental backup d(4) represents the state of the source storage 106 at time t(4), and the updated base backup b(5) represents the state of the source storage 106 at time t(5). The base backup b(5) may be associated with the FSBAM(5), which represents the allocated and free blocks of the source storage 106 at time t(5).

Therefore, decremental backups may be created on an ongoing basis. The frequency of creating new decremental backups may be altered as desired in order to adjust the amount of data that will be lost should the source storage 106 experience corruption of its stored data or become unavailable at any given point in time. The data from the source storage 106 can be restored to the state at the point in time of a particular decremental backup by applying the image backups to a restore storage from newest to oldest, namely, first applying the base backup and then applying each successive decremental backup up to the particular decremental backup.

For example, the data from the source storage 106 can be restored to the state at time t(1), after time t(2), by applying the base backup b(2) and then applying the decremental backup d(1). Similarly, the data from the source storage 106 can be restored to the state at time t(1), after time t(5), by applying the base backup b(5), then applying the decremental backups d(4), d(3), and d(2), and finally applying the decremental backup d(1). Alternatively, the data from the source storage 106 can be restored to the state at the point in time of a particular decremental backup by applying the image backups to the restore storage concurrently, namely, concurrently applying the base backup and each successive decremental backup up to the particular decremental backup. For example, the data from the source storage 106 may be restored to the state at time t(1), after time t(5), by accessing the base backup b(5) and the decremental backups d(4), d(3), d(2), and d(1) concurrently, and retrieving from each backup the correct block content corresponding to time t(1). Advantageously, the most recent backup state of the source storage 106 can be restored at any stage of the decremental backup chain 200 by simply applying the base backup of the decremental backup chain 200.

Since the FSBAM(1)-FSBAM(5) represent states of the source storage 106 at times t(1)-t(5), respectively, each of FSBAM(1)-FSBAM(5) may be associated with all backups in the decremental backup chain 200 that correspond to the point in time represented by the FSBAM. For example, since the FSBAM(1) and the backups b(1) and d(1) all represent states of the source storage 106 at time t(1), the FSBAM(1) may be associated with the backups b(1) and d(1), as illustrated in FIG. 2B. In some embodiments, an FSBAM associated with a decremental backup in a decremental backup chain may be reconstructed by searching forward in the decremental backup chain, beginning with the decremental backup, for the first block for each of one or more block positions that make up the FSBAM in order to reconstruct the FSBAM. Similarly, an FSBAM associated with a base backup in a decremental backup chain may be accessed by accessing one or more blocks in the base backup that make up the FSBAM. In other embodiments, a complete copy of the FSBAM may be associated with a decremental backup or a base backup in a decremental backup chain.

In addition to the ongoing creation of new decremental backups in the decremental backup chain 200, one or more of the oldest decremental backups in the decremental backup chain 200, such as the decremental backup d(1), may be removed in order to reduce the size of the decremental backup chain 200. For example, at time t(5.5), which is after time t(5) but prior to the time t(6) of the creation of the next decremental backup in the decremental backup chain 200, the oldest decremental backup d(1) may be removed from the decremental backup chain 200, as disclosed in FIG. 2B.

In some circumstances, blocks that were allocated in the source storage 106 at the time represented by the oldest decremental backup in a decremental backup chain are free at the times represented by other backups in the decremental backup chain. For example, by comparing each of the FSBAM(1)-FSBAM(5) to each other, it can be determined that although the blocks at positions 2 and 7 were allocated in the source storage 106 at time t(1) represented by the decremental backup d(1), the block at position 2 in the source storage 106 was not allocated at times t(2)-t(5) represented by the decremental backups d(2), d(3), and d(4) and the base backup b(5) and the block at position 7 in the source storage was not allocated at times t(2) and t(3) represented by the decremental backups d(2) and d(3). Therefore, once the oldest decremental backup d(1) is removed from the decremental backup chain 200 at time t(5.5) as disclosed in FIG. 2B, the example methods for pruning free blocks out of a decremental backup chain disclosed herein may be employed to prune the free blocks at positions 2 and 7 out of certain backups in the decremental backup chain 200, as discussed below.

FIG. 3 is a schematic block diagram illustrating an example pruning of the decremental backup d(3) in the decremental backup chain 200. The example pruning of the decremental backup d(3) may be performed after removal of the oldest decremental backup d(1) from the decremental backup chain 200 at time t(5.5), as disclosed in FIG. 2B, in order to decrease the size of the decremental backup d(3) by removing any unnecessarily retained free blocks from the decremental backup d(3).

As disclosed in FIG. 3, the pruning of the decremental backup d(3) may include retrieving the FSBAM(3) for time t(3) represented by the decremental backup d(3) and retrieving the FSBAM(2) for time t(2) represented by the decremental backup d(2), since the decremental backup d(2) depends on the decremental backup d(3). The FSBAM(2) and the FSBAM(3) may then be combined to create a master block allocation map (MBAM), namely, the MBAM(2-3). This combination results in the MBAM(2-3) representing a position as being allocated, with a 1 bit, where the FSBAM(2) and/or the FSBAM(3) represent(s) the position as being allocated. Conversely, this combination results in the MBAM(2-3) representing a position as being free, with a 0 bit, only where both the FSBAM(2) and the FSBAM(3) represent the position as being free. This combination may be accomplished by performing a conceptual boolean OR operation on the FSBAM(2) and the FSBAM(3). It is understood that the boolean OR operation may be conceptual since the FSBAM(2) and the FSBAM(3) may be implemented using a data structure that does not necessarily include a bit for each block position, such as a run-length encoded list. For example, the MBAM(2-3) may be a comprehensive run-length encoded list of allocated blocks that lists all allocated blocks that are listed in either of the run-length encoded lists of the FSBAM(2) and the FSBAM(3).

As disclosed in FIG. 3, the pruning of the decremental backup d(3) may also include pruning free blocks, corresponding to block positions that are indicated as being free in the MBAM(2-3), out of the decremental backup d(3). The term "pruning free blocks out of a backup," or variations of this term, as used herein, refers to either removing the free blocks from the backup itself or creating a copy of the backup in which the free blocks are excluded. For example, as disclosed in FIG. 3, since position 7 is indicated as being free in the MBAM(2-3), the block at position 7 in the decremental backup d(3) is pruned out of the decremental backup d(3), resulting in the pruned decremental backup pd(3). As noted previously, the pruned decremental backup pd(3) may either be the decremental backup d(3) itself with the free block at position 7 removed or may be a copy of the decremental backup d(3) in which the free block at position 7 is excluded. By pruning the free block at position 7 out of the decremental backup d(3), the resulting pruned decremental backup pd(3) is only ¾ of the size of the original decremental backup d(3).

Figure 4:
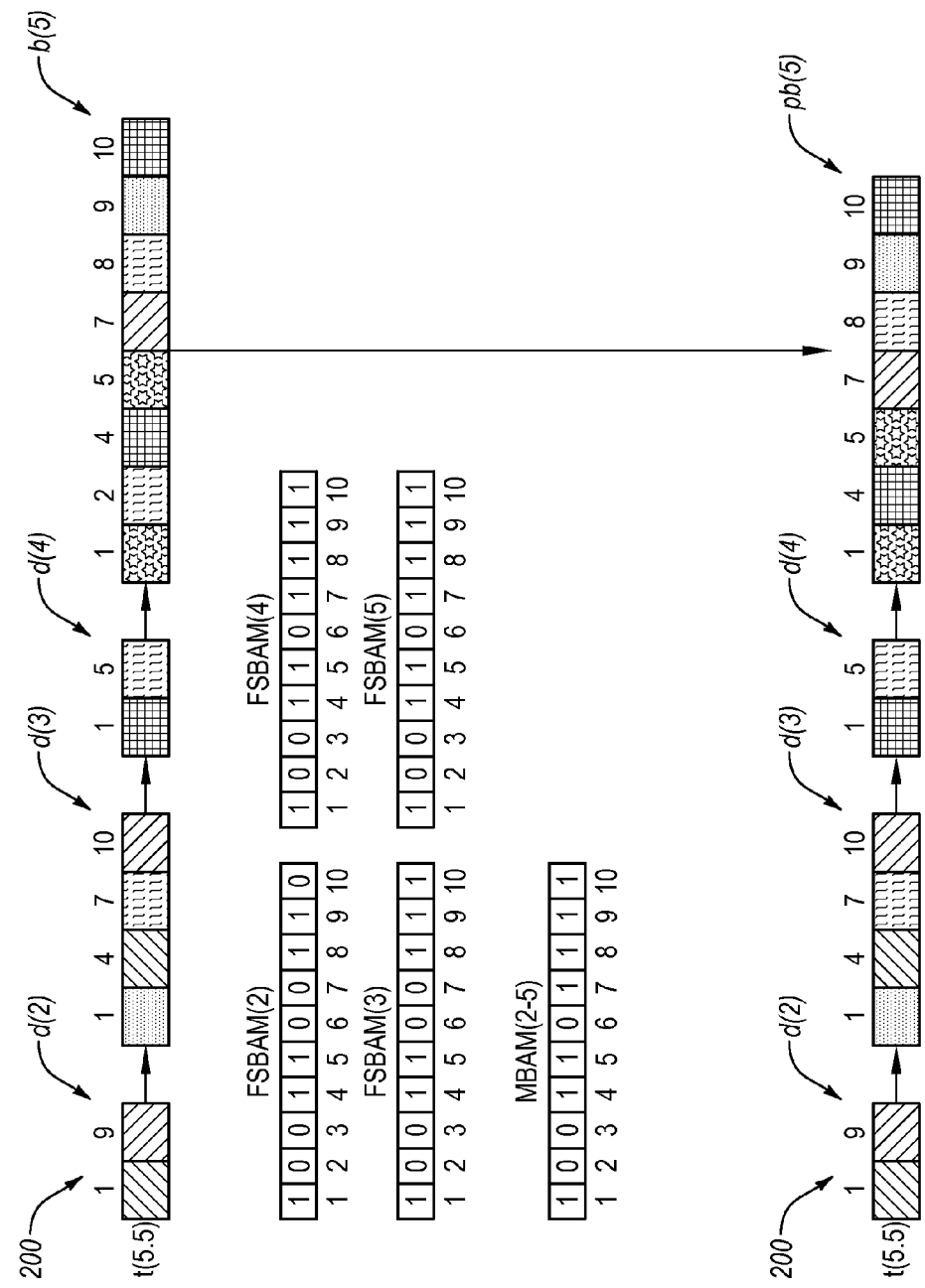
FIG. 4 is a schematic block diagram illustrating an example pruning of a base backup in a decremental backup chain.

FIG. 4 is a schematic block diagram illustrating an example pruning of the base backup b(5) in the decremental backup chain 200. The example pruning of the base backup b(5) may be performed after removal of the oldest decremental backup d(1) from the decremental backup chain 200 at time t(5.5), as disclosed in FIG. 2B, in order to decrease the size of the base backup b(5) by removing any unnecessarily retained free blocks from the base backup b(5).

As disclosed in FIG. 4, the pruning of the base backup b(5) may include retrieving the FSBAM(5) for time t(5) represented by the base backup b(5) and retrieving the FSBAM(2)-FSBAM(4) for times t(2)-t(4) represented by the decremental backups d(2)-d(4), respectively, since the decremental backups d(2)-d(4) depend, directly or indirectly, on the base backup b(5). The FSBAM(2)-FSBAM(5) may then be combined to create a MBAM(2-5). This combination results in the MBAM(2-5) representing a position as being allocated, with a 1 bit, where any of the FSBAM(2)-FSBAM(5) represent(s) the position as being allocated. Conversely, this combination results in the MBAM(2-5) representing a position as being free, with a 0 bit, only where all of the FSBAM(2)-FSBAM(5) represent the position as being free. This combination may be accomplished by performing a conceptual boolean OR operation on the FSBAM(2)-FSBAM(5). It is understood that the boolean OR operation may be conceptual since the FSBAM(2)-FSBAM(5) may be implemented using a data structure that does not necessarily include a bit for each block position, such as a run-length encoded list. For example, the MBAM(2-5) may be a comprehensive run-length encoded list of allocated blocks that lists all allocated blocks that are listed in any of the run-length encoded lists of the FSBAM(2)-FSBAM(5).

As disclosed in FIG. 4, the pruning of the base backup b(5) may also include pruning free blocks, corresponding to block positions that are indicated as being free in the MBAM(2-5), out of the base backup b(5). For example, as disclosed in FIG. 4, since the position 2 is indicated as being free in the MBAM(2-5), the block at position 2 in the base backup b(5) is pruned out of the base backup b(5), resulting in the pruned base backup pb(5). As noted previously, the pruned base backup pb(5) may either be the base backup b(5) itself with the free block at position 2 removed or may be a copy of the base backup b(5) in which the free block at position 5 is excluded. Due to the relatively large size of the base backup b(5) as compared to the decremental backups d(2)-d(4), pruning the free block at position 2 out of the base backup b(5) may be more likely to be accomplished by removing the free block at position 2 out of the base backup b(5) itself, but making a copy of the base backup b(5) in which the free block at position 2 has been excluded is possible and may be preferable in certain situations. By pruning the free block at position 2 out of the base backup b(5), the resulting pruned base backup pb(5) is only ⅞ of the size of the original base backup b(5).

Figure 5:
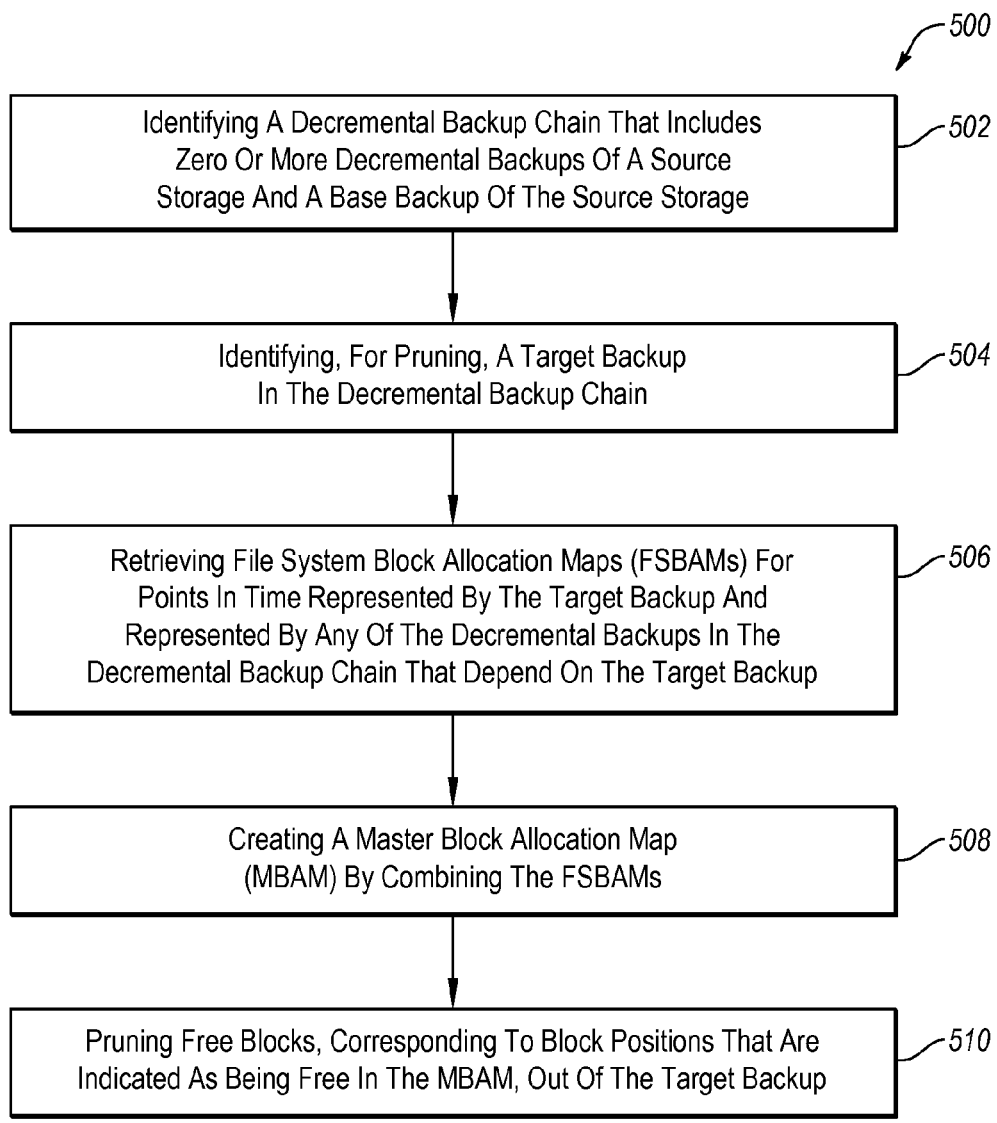
FIG. 5 is a schematic flowchart diagram of an example method for pruning free blocks out of a decremental backup chain.

FIG. 5 is a schematic flowchart diagram of an example method 500 for pruning free blocks out of a decremental backup chain. The method 500 may be implemented, in at least some embodiments, by the pruning module 120 of the destination system 104 of FIG. 1. For example, the pruning module 120 may be configured to execute computer instructions to perform operations of pruning free blocks out of the decremental backup chain 200, as represented by one or more of steps 502-510 of the method 500. The method 500 will now be discussed with reference to FIGS. 1, 3, 4, and 5.

The method 500 may include step 502 of identifying a decremental backup chain that includes zero or more decremental backups of a source storage and a base backup of the source storage. For example, the pruning module 120 of FIG. 1 may identify, at step 502, the decremental backup chain 200 of FIGS. 3 and 4. The decremental backup chain 200 of FIGS. 3 and 4 includes the decremental backups d(2)-d(4), since the decremental backup d(1) was removed at time t(5.5). The decremental backup chain 200 of FIGS. 3 and 4 also includes the base backup b(5).

The method 500 may include step 504 of identifying, for pruning, a target backup in the decremental backup chain. Continuing with the above example, the pruning module 120 of FIG. 1 may identify, at step 504, the decremental backup d(3) of FIG. 3 as a target for pruning or the base backup b(5) of FIG. 4 as a target for pruning.

The method 500 may include step 506 of retrieving one or more file system block allocation maps (FSBAMs) for points in time represented by the target backup and represented by any of the decremental backups in the decremental backup chain that depend on the target decremental backup. Continuing with the above example, the pruning module 120 of FIG. 1 may retrieve, at step 506, the FSBAM(2) and FSBAM(3) where the decremental backup d(3) of FIG. 3 is the pruning target or the FSBAM(2)-FSBAM(5) where the base backup b(5) of FIG. 4 is the pruning target. It is noted that where no decremental backups in the decremental backup chain depend on the target decremental backup, only the single FSBAM for the point in time represented by the target decremental backup will be retrieved at step 506.

The method 500 may include step 508 of creating a master block allocation map (MBAM) by combining the FSBAMs. Continuing with the above example, the pruning module 120 of FIG. 1 may create, at step 508, the MBAM(2-3) of FIG. 3 where the decremental backup d(3) of FIG. 3 is the pruning target or the MBAM(2-5) where the base backup b(5) of FIG. 4 is the pruning target. It is noted that where only a single FSBAM is retrieved at step 506, step 508 results in an MBAM that is a copy of the single FSBAM.

The method 500 may include step 510 of pruning free blocks, corresponding to block positions that are indicated as being free in the MBAM, out of the target backup. Continuing with the above example, the pruning module 120 of FIG. 1 may prune, at step 510, the free block at position 7 out of the decremental backup d(3), resulting in the pruned decremental backup pd(3) (where the decremental backup d(3) of FIG. 3 is the pruning target) or the free block at position 2 out of the base backup b(5), resulting in the pruned base backup pb(5) (where the base backup b(5) of FIG. 5 is the pruning target).

In some embodiments, a pruning policy may dictate whether and/or when a target backup in the decremental backup chain is pruned at step 510. For example, the pruning policy may dictate that free blocks be pruned out of the target backup in response to a predetermined period of time, as set forth in the pruning policy, having passed since a most recent pruning of free blocks out of the target backup. Additionally or alternatively, the pruning policy may dictate that free blocks be pruned out of the target backup in response to reaching a predetermined point in time, as set forth in a pruning policy, for pruning of free blocks out of the base backup. Additionally or alternatively, the pruning of free blocks at step 510 may be performed in response to receiving input from a user that specifies the performance of the pruning of free blocks out of the target backup, or that specifies the performance of the pruning of free blocks out of the target backup during a particular time period. Additionally or alternatively, the pruning of free blocks at step 510 may be performed in response to the removing of one or more oldest decremental backups from the decremental backup chain. The removing of one or more oldest decremental backups from the decremental backup chain may be performed in response to: 1) a predetermined period of time, as set forth in a retention policy, having passed since the point in time represented by the oldest decremental backup or represented by the newest backup of the one or more oldest decremental backups; 2) a predetermined aggregate size limit, as set forth in the retention policy, having been reached for the decremental backup chain; 3) a predetermined number of backups limit, as set forth in the retention policy, having been reached for the decremental backup chain, or 4) some combination thereof.

Therefore, the method 500 may be employed to prune free blocks out of the decremental backup chain 200. The example method 500 may enable the free block at position 7 of the decremental backup d(3) and the free block at position 2 of the base backup b(5) to be identified and then pruned out of these backups. This pruning may decrease the overall size requirements of a destination storage 108 where these backups are stored, decrease the bandwidth overhead of transporting these backups, decrease the processing time associated with consolidating these backups with other backups in the decremental backup chain 200, and/or decrease the processing time associated with restoring these backups.

The embodiments described herein may include the use of a special-purpose or general-purpose computer, including various computer hardware or software modules, as discussed in greater detail below.

Embodiments described herein may be implemented using non-transitory computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store one or more desired programs having program code in the form of computer-executable instructions or data structures and which may be accessed and executed by a general-purpose computer, special-purpose computer, or virtual computer such as a virtual machine. Combinations of the above may also be included within the scope of computer-readable media.

Computer-executable instructions comprise, for example, instructions and data which, when executed by one or more processors, cause a general-purpose computer, special-purpose computer, or virtual computer such as a virtual machine to perform a certain method, function, or group of methods or functions. Although the subject matter has been described in language specific to structural features and/or methodological steps, it is to be understood that the subject matter defined in the appended claims is not necessarily limited to the specific features or steps described above. Rather, the specific features and steps described above are disclosed as example forms of implementing the claims.

As used herein, the term "module" may refer to software objects or routines that execute on a computing system. The different modules or filters described herein may be implemented as objects or processes that execute on a computing system (e.g., as separate threads). While the system and methods described herein are preferably implemented in software, implementations in hardware or a combination of software and hardware are also possible and contemplated.

All examples and conditional language recited herein are intended for pedagogical objects to aid the reader in understanding the example embodiments and the concepts contributed by the inventor to furthering the art, and are to be construed as being without limitation to such specifically-recited examples and conditions.

The invention claimed is:

1. A method for pruning free blocks out of a decremental backup in a decremental backup chain, the method comprising:
    identifying a decremental backup chain that includes one or more decremental backups of a source storage and a base backup of the source storage;
    identifying, for pruning, a target decremental backup in the decremental backup chain;
    retrieving one or more file system block allocation maps (FSBAMs) for points in time represented by the target decremental backup and represented by any of the other decremental backups in the decremental backup chain that depend on the target decremental backup;
    creating a master block allocation map (MBAM) by combining the one or more FSBAM; and
    pruning free blocks, corresponding to block positions that are indicated as being free in the MBAM, out of the target decremental backup.

2. The method of claim 1, wherein the pruning of the free blocks is performed in response to:
    a predetermined period of time, as set forth in a pruning policy, having passed since a most recent pruning of free blocks out of the target decremental backup.

3. The method of claim 1, wherein the pruning of the free blocks is performed in response to:
    receiving input from a user that specifies the performance of the pruning of free blocks out of the target decremental backup.

4. The method of claim 1, wherein the pruning of the free blocks is performed in response to:
    removing an oldest decremental backup from the decremental backup chain.

5. The method of claim 4, wherein the removing of the oldest decremental backup from the decremental backup chain is performed in response to:
    a predetermined period of time, as set forth in a retention policy, having passed since the point in time represented by the oldest decremental backup;
    a predetermined aggregate size limit, as set forth in the retention policy, having been reached for the decremental backup chain;
    a predetermined number of backups limit, as set forth in the retention policy, having been reached for the decremental backup chain; or
    some combination thereof.

6. The method of claim 1, wherein the retrieving of the one or more FSBAM includes:
    for each FSBAM, searching forward in the decremental backup chain, from the backup in the decremental backup chain that represents the point in time of the FSBAM, for the first block for each of one or more block positions that make up the FSBAM in order to reconstruct the FSBAM.

7. The method of claim 1, wherein the retrieving of the one or more FSBAM includes:
    for each FSBAM, retrieving a complete copy of the FSBAM that is associated with the decremental backup in the decremental backup chain that represents the point in time of the FSBAM.

8. The method of claim 1, wherein each of the one or more FSBAMs includes a run-length encoded list of free blocks and/or allocated blocks.

9. The method of claim 8, wherein the creating of the MBAM includes creating a comprehensive run-length encoded list of free and/or allocated blocks that lists all free and/or allocated blocks that are listed in any of the run-length encoded lists of the one or more FSBAM.

10. One or more non-transitory computer-readable media storing one or more programs that are configured, when executed, to cause one or more processors to perform the method as recited in claim 1.

11. A method for pruning free blocks out of a base backup of a decremental backup chain, the method comprising:
   identifying a decremental backup chain that includes zero or more decremental backups of a source storage and a base backup of the source storage;
   retrieving one or more file system block allocation maps (FSBAMs) for each point in time represented by the backup(s) in the decremental backup chain;
   creating a master block allocation map (MBAM) by combining the one or more FSBAM; and
   pruning free blocks, corresponding to block positions that are indicated as being free in the MBAM, out of the base backup.

12. The method of claim 11, wherein the pruning of the free blocks is performed in response to:
   reaching a predetermined point in time, as set forth in a pruning policy, for pruning of free blocks out of the base backup.

13. The method of claim 11, wherein the pruning of the free blocks is performed in response to:
   receiving input from a user that specifies the performance of the pruning of free blocks out of the base backup during a particular period of time.

14. The method of claim 11, wherein the pruning of the free blocks is performed in response to:
   removing one or more oldest decremental backups from the decremental backup chain.

15. The method of claim 14, wherein the removing of the one or more oldest decremental backups from the decremental backup chain is performed in response to:
   a predetermined period of time, as set forth in a retention policy, having passed since the point in time represented by the newest backup of the one or more oldest decremental backups;
   a predetermined aggregate size limit, as set forth in the retention policy, having been reached for the decremental backup chain;
   a predetermined number of backups limit, as set forth in the retention policy, having been reached for the decremental backup chain; or
   some combination thereof.

16. The method of claim 11, wherein the retrieving of the one or more FSBAMs includes:
   for each FSBAM, searching forward in the decremental backup chain, from the backup in the decremental backup chain that represents the point in time of the FSBAM, for the first block for each of one or more block positions that make up the FSBAM in order to reconstruct the FSBAM.

17. The method of claim 11, wherein the retrieving of the one or more FSBAMs includes:
   for each FSBAM, retrieving a complete copy of the FSBAM that is associated with the backup in the decremental backup chain that represents the point in time of the FSBAM.

18. The method of claim 11, wherein each of the one or more FSBAMs includes a run-length encoded list of free and/or allocated blocks.

19. The method of claim 18, wherein the creating of the MBAM includes creating a comprehensive run-length encoded list of free and/or allocated blocks that lists all free and/or allocated blocks that are listed in any of the run-length encoded lists of the FSBAMs.

20. One or more non-transitory computer-readable media storing one or more programs that are configured, when executed, to cause one or more processors to perform the method as recited in claim 11.

* * * * *